June 10, 1930.  G. F. WIKLE  1,762,849
MANUFACTURE OF PNEUMATIC TIRE CASINGS
Filed Nov. 22, 1926   3 Sheets-Sheet 1
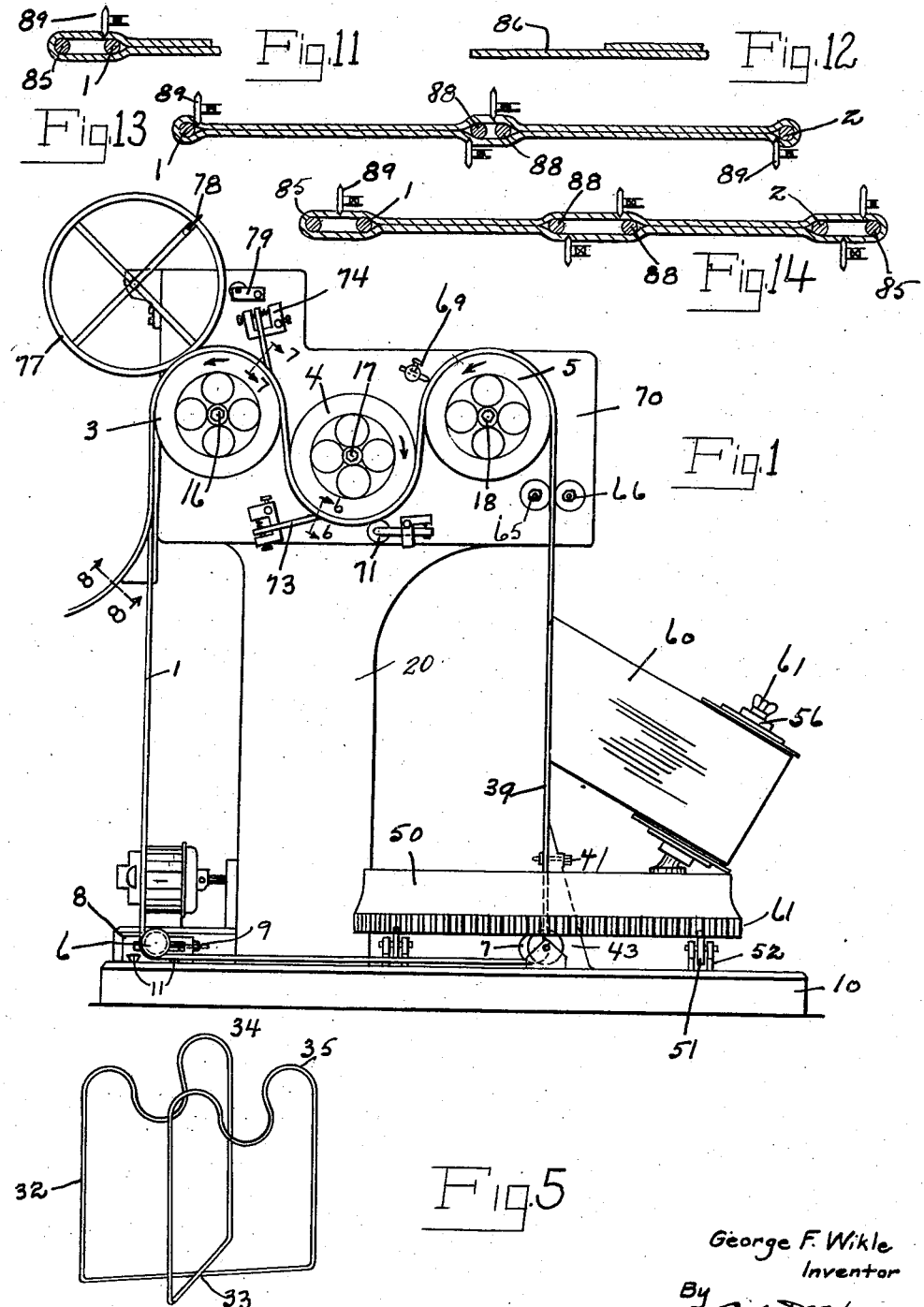

June 10, 1930.  G. F. WIKLE  1,762,849
MANUFACTURE OF PNEUMATIC TIRE CASINGS
Filed Nov. 22, 1926  3 Sheets-Sheet 2
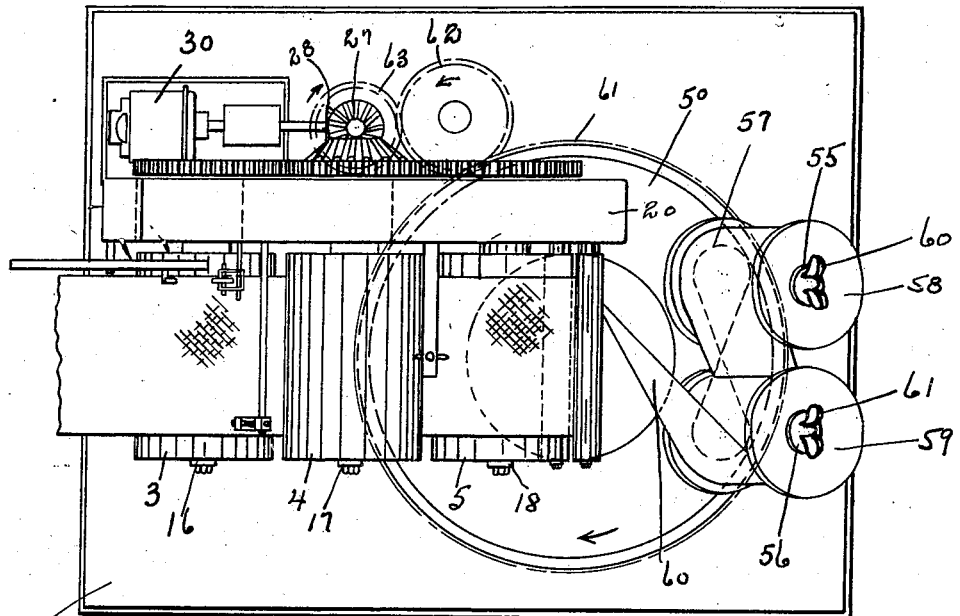
George F. Wikle
Inventor
By Robert T. Harney
Attorney

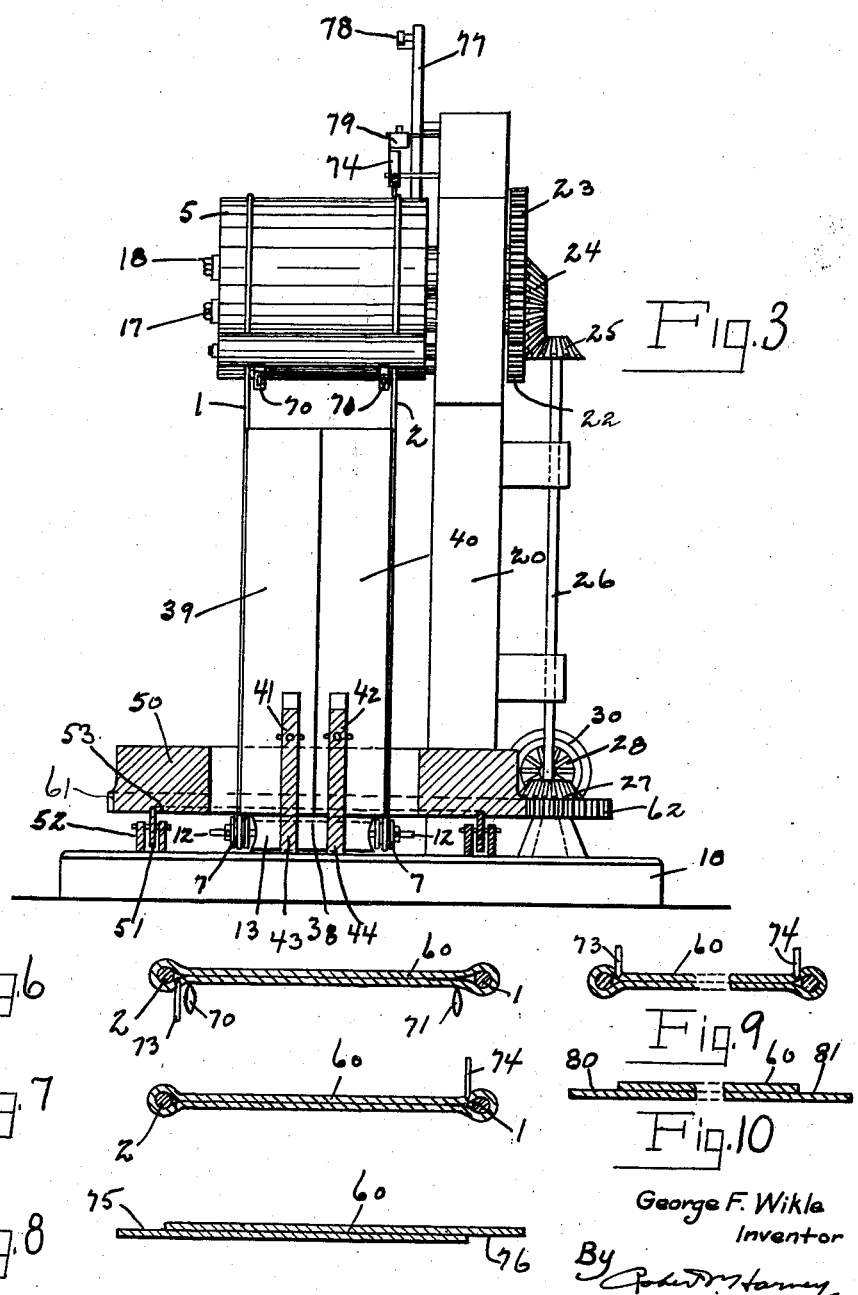

Patented June 10, 1930

1,762,849

UNITED STATES PATENT OFFICE

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

MANUFACTURE OF PNEUMATIC TIRE CASINGS

Application filed November 22, 1926. Serial No. 149,962.

My invention relates to the manufacture of pneumatic tire casings and more particularly to the preparation of the material which is used in constructing the carcass of such casings. This material may be square woven or cord fabric and while my invention is particularly useful in the manufacture of cord tires and is illustrated in connection therewith, my method and device is not limited thereto and the term "fabric" as hereafter used in the specification and claims is intended to include all types of carcass material.

It is the practice in following various building methods to first form the carcass material into two-ply strips of suitable width and having the strain resisting elements of the respective plies laying at an angle to each other. It is among the objects of my invention to provide a method of forming the carcass material into a two-ply strip or strips in a more expeditious manner and to secure a more uniform product, and to provide a device for carrying out the method. A further object is to provide such two-ply carcass material in long lengths which may be later separated if desired into lengths to suit various sizes of tires and various methods of building. A further object is to form strips in which the plies are offset or stepped-off from each other. Other and further objects will be apparent from the following specification and claims.

In the accompanying drawings which illustrate one embodiment of my invention,

Figure 1 is a side elevation of my machine,

Figure 2 is a plan view of the machine,

Figure 3 is a rear end view partly in section,

Figure 4 is a fragmentary elevation, of the side opposite to that of Figure 1, showing the driving connections, Figure 5 is a perspective view of an alternative arrangement of the supporting cables, Figures 6, 7 and 8 are sectional views taken substantially on lines 6—6, 7—7 and 8—8, respectively, of Figure 1, Figures 9 and 10 are sections similar to Figures 7 and 8 but showing an alternative arrangement of the knives to produce a different type of step-off, Figures 11 and 12 show an alternative arrangement of the cables to produce a wide step-off, Figure 13 shows an alternative arrangement for producing a plurality of strips having narrow step-offs, and Figure 14 is a view similar to that of Figure 13, but showing an arrangement to secure wide step-offs.

Referring to the drawings 1 and 2 designate endless cables supported, as best shown in Figures 1 and 3, in spaced parallel planes by driven rolls 3, 4 and 5 and idle pulleys 6 and 7. Pulleys 6 are mounted in slotted bearings 8 provided with adjusting screws 9, adapted to tighten the cables, and said bearings are secured to base 10 of the machine on keyways 11 to provide transverse adjustment for a purpose later described. Pulleys 7 are adjustably secured to rotatable stub shafts 12 mounted in a support 13, secured to base 8. While I have shown the cables as round in cross section they may if preferred take the form of a flat ribbon, or any other suitable shape.

Driven rolls 3, 4 and 5 are mounted respectively on shaft 16, 17 and 18, supported in bearings formed in a standard 20, rising from base 8, and said shafts are provided at the rear of the standard with intermeshing gears 21, 22 and 23 respectively. Shaft 17 in addition carries a bevel gear 24 meshing with a bevel gear 25 secured to the upper end of a vertical shaft 26 (see Figure 4) provided at its lower end with a bevel gear 27 meshing with bevel gear 28 on shaft 29, the latter operatively connected to a motor 30 through any conventional or suitable type of reduction gearing diagrammatically indicated at 31. As will be evident rolls 3, 4 and 5 are thus driven in the direction of the arrows in Figure 1, and through them the cables 1 and 2. In Figure 5 I have illustrated an arrangement in which cables 1 and 2 are replaced by a single cable 32 crossed at 33 so as to present two parallel runs 34 and 35 traveling in the same direction. This arrangement has the advantage that a single tightening means may be used to keep the cable taut and assures that the runs travel at the same speed, but it has the disadvantage that it is more difficult to vary the spacing of the runs.

The upper edge of support 13 is provided with a groove 38 adapted to receive spacer plates 39 and 40 adjustably held in position by bolts 41 and 42 passing through the plates and verticle extensions 43 and 44 of support 13. Plates 39 and 40 serve to maintain the cables 1 and 2 in proper spaced relation as the fabric is applied, as later described, and the adjustable mounting of the plates in connection with the adjustability of pulleys 6 and 7 previously referred to permit the space between the cables to be increased to provide wider strips of carcass material.

Surrounding the cables and plates 39 and 40 is an annular table 50 rotatably mounted on rollers 51, journaled in suitable bearings 52 secured to base 10, and running in track 53 formed in the under side of the table. Table 50 is adapted to carry a supply of fabric from which the carcass material is formed and in the embodiment shown I provide for this purpose a pair of inclined spindles 55 and 56 preferably connected together by a belt 57 and adapted to receive spools 58 and 59 which are held on the spindles by wing nuts 60 and 61. Spool 58 carries a roll of fabric wound in a suitable liner, the liner and fabric being drawn from spool 58 about spool 59, upon which the liner is wound, while the fabric 60 passes to the cables as shown in Figures 1 and 2. Table 50 is rotated in the direction of the arrow by means of a ring gear 61 formed on the outer circumference of table 50 and meshing with a gear 62 (see Figure 2) which in turn meshes with a gear 63 secured to vertical shaft 26 previously described.

As will be evident when power is applied to advance the cables 1 and 2 and rotate table 50 the fabric will be drawn from the spools and wrapped spirally about the cables, to form a flat tube of fabric.

As the cables advance the tube of fabric is carried between freely rotatable presser rolls 65 and 66 supported by standard 20 and thence over roll 5, under roll 4 and over roll 3. As it passes over roll 5 the fabric is preferably marked with a centering line, as by a crayon or other marking means 69 supported from standard 20, such centering line being useful in later operations when the fabric is formed into a tire carcass on the tire building machine. As the web of fabric passes beneath roll 4 it is engaged, adjacent the cables, by stitchers 70 and 71 (see Figure 6) suitably supported from a standard 20, which stitchers assure the adhesion of the fabric plies adjacent the cables. As the fabric advances around roll 4 the outer ply is cut close to, or against, the cable 2 by a suitable knife 73 and as it travels over the roll 3 the opposite ply is cut as indicated in Figure 7 by a similar knife 74. The fabric is now pulled from the cables, as indicated in Figure 1, as a two-ply strip of carcass material having the strain resisting elements of the respective plies crossing at an angle to each other and having the edges of the plies stepped-off as indicated at 75 and 76 in Figure 8. The two-ply strip after leaving the machine may be torn into lengths suitable for the tire building machines and to avoid the necessity of measuring each length as it is torn I provide means for applying a mark adjacent one edge of the strip to indicate the point at which the tear is to be made. Any suitable means may be employed for this purpose, that shown comprising a wheel 77 of suitable diameter provided with an offset finger 78. Wheel 77 is driven by engagement with roll 3 adjacent cable 2, and finger 78 as it rotates engages the fabric strip and ink supply roll 79.

It is sometimes desirable to have both step-offs on one face of the strip in which case I position the cutting knives 73 and 74 so as to operate on the same side of the fabric tube, as indicated in Figure 9, with the result that when pulled from the cables the step-offs 80 and 81 are on the same face of the web as shown in Figure 10.

As will be understood, in the arrangements just described the width of step-off is limited by the diameter of the cable and where a wider step-off is desired I supply additional cables 85 adjacent cables 1 and 2 as indicated in Figure 11, in which case, by cutting adjacent cable 1, a wide step-off 86 is obtained, the width being determined by the spacing of the cables 85 and 1.

In the embodiment shown a single strip of carcass material is formed, but by supplying center cables 88 as shown in Figures 13 and 14 a plurality of strips may be formed, Figure 13 illustrating the arrangement for producing a narrow step-off and Figure 14 the arrangement for producing a wide step-off. Where the fabric is cut between cables I prefer to use rotary cutters as indicated at 89 and such cutters may of course be substituted for the knives shown in the other figures.

It will be evident that by my method and machine I produce one or more strips of complete two-ply carcass material centrally marked and marked into lengths suitable for the tire building operations, as a continuous operation.

I claim:

1. A device of the character described comprising spaced parallel cables, means to advance the cables in unison, means adapted to wind a strip of fabric about the cables, as the latter are advanced, to form a two-ply web of fabric with cables enclosed at the edges thereof and means adapted to cut one ply of the fabric longitudinally adjacent the cables and so positioned as to permit removal of the fabric from the cables as two-ply carcass material having stepped-off edges.

2. A device of the character described comprising spaced parallel cables, means to advance the cables in unison, means adapted to wind a strip of fabric about the cables, as the latter are advanced, to form a two-ply web of fabric with cables enclosed at the edges thereof, means in the path of the assembled cables and fabric to press the overlying fabric plies together and means adapted to cut one ply of the fabric longitudinally adjacent the cables and so positioned as to permit removal of the fabric from the cables as two-ply carcass material having stepped-off edges.

3. A device of the character described comprising spaced parallel cables, means to advance the cables in unison, means adapted to wind a strip of fabric about the cables, as the latter are advanced, a pair of rolls between which the cables and fabric pass adapted to press the overlying fabric plies together, supporting rolls over which the assembled cables and fabric pass and means operative as the assembly passes said rolls to cut one ply of the fabric longitudinally adjacent the cables and so positioned as to permit removal of the fabric from the cables as two-ply carcass material having stepped-off edges.

4. A device of the character described comprising spaced parallel cables, means to advance the cables in unison, means adapted to wind a strip of fabric about the cables, as the latter are advanced to form a two-ply web of fabric with cables enclosed at the edges thereof, supporting rolls over which the assembled cables and fabric passes and means positioned in operative relation to said rolls adapted to cut one ply of the fabric longitudinally adjacent the cables and so positioned as to permit removal of the fabric from the cables as two-ply carcass material having stepped-off edges.

5. A device of the character described comprising spaced parallel cables, means to advance the cables in unison, means adapted to wind a strip of fabric about the cables, as the latter are advanced, to form a two-ply web of fabric with cables enclosed at the edges thereof, a supporting roll adapted to engage one face of the fabric web, cutting means associated with said roll adapted to cut the outer ply of fabric longitudinally adjacent one edge of the web, a second supporting roll adapted to engage the opposite face of the web and cutting means associated with said second supporting roll adapted to cut the then outer ply of fabric longitudinally adjacent the other edge of the web to permit removal of the fabric from the cables as a strip of two-ply carcass material having opposite step-offs at the edges of the strip.

6. A device of the character described comprising spaced parallel cables, means to advance the cables in unison, means adapted to wind a strip of fabric about the cables, as the latter are advanced, to form a two-ply web of fabric with cables enclosed at the edges thereof, supporting rolls over which the assembled cables and fabric pass, stitchers associated therewith adapted to stitch the plies together adjacent the cables and means to cut the fabric longitudinally adjacent the cables to permit removal of the fabric from the cables as two-ply carcass material.

7. A device of the character described comprising spaced parallel cables, means to advance the cables in unison, means adapted to wind a strip of fabric about the cables, as the latter are advanced, to form a two-ply web of fabric with cables enclosed at the edges thereof, rolls between which the cables and fabric pass adapted to press the overlying fabric plies together, supporting rolls over which the assembled cables and fabric pass, stitchers operative as the assembly passes over the supporting rolls to stitch the plies together adjacent the cables and means to cut the fabric adjacent the cables to permit removal of the fabric from the cables as two-ply carcass material.

8. That method of forming two ply carcass material which comprises wrapping rubberized fabric spirally about spaced cables to form a flat two-ply web, and cutting one ply of the fabric at a point adjacent the cables and in such relation thereto as to produce a predetermined width of step-off at the edges of the two-ply strip of carcass material upon removal of the latter from the cables.

In testimony whereof I have signed my name to the above specification.

GEORGE F. WIKLE.